Patented Dec. 14, 1948

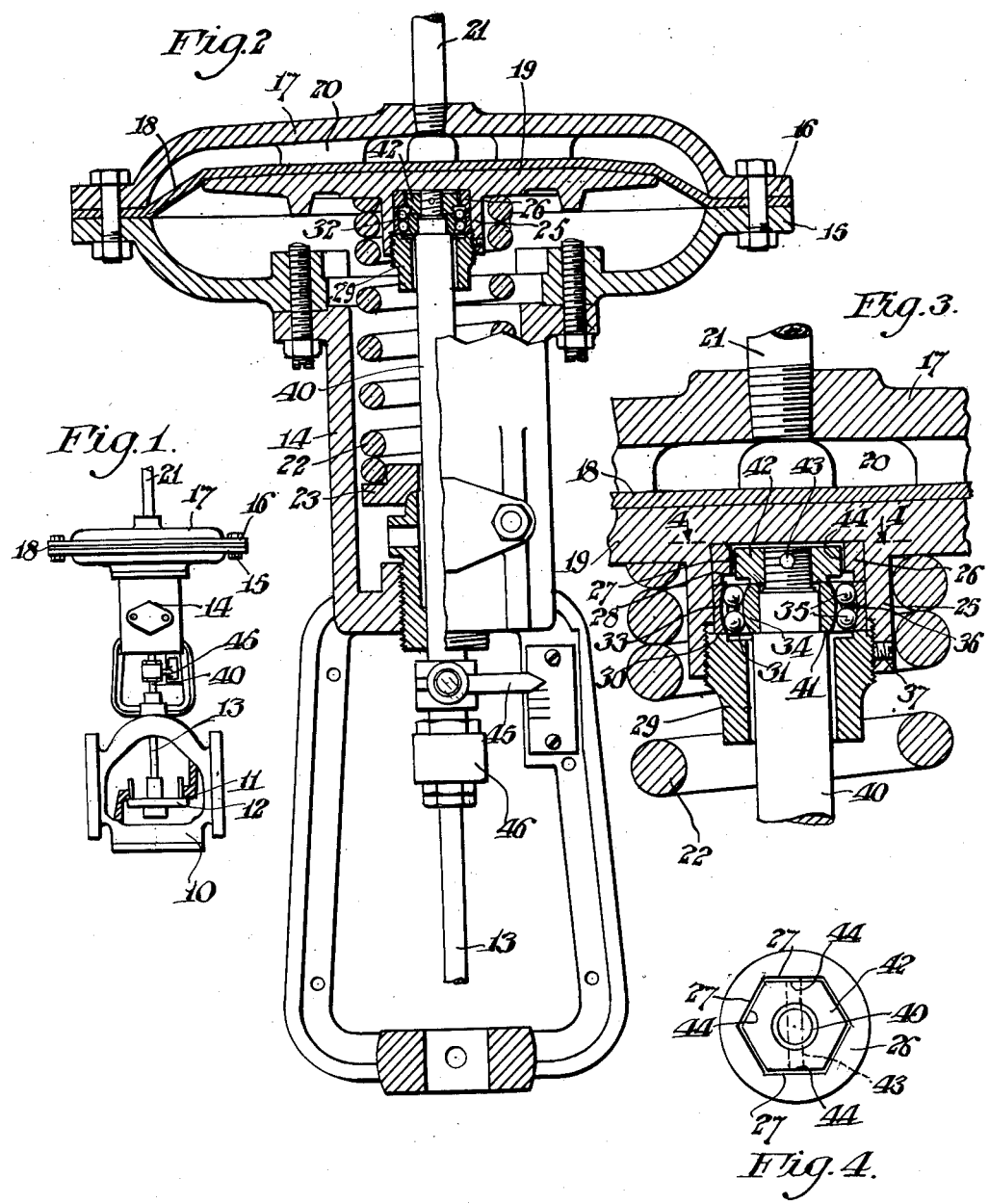

2,456,403

UNITED STATES PATENT OFFICE 2,456,403

DIAPHRAGM CONTROL VALVE

Francis Rudolph Goehring, Philadelphia, Pa., assignor to H. Belfield Company, Philadelphia, Pa., a corporation of Pennsylvania Application February 12, 1944, Serial No. 522,035

5 Claims. (Cl. 137—153)

This invention relates to diaphragm control valves.

Considerable difficulty has heretofore been encountered in connection with diaphragm control valves, and particularly those which are fluid pressure operated, by reason of friction in the connections between the diaphragm or pressure responsive element of the valve and the valve disc plug. Certain of these difficulties arose at the stuffing box and these may be readily remedied. Other difficulties arose by reason of the tilting of the diaphragm upon the application of pressure fluid thereon. This tilting caused a side thrust or horizontal component of force which resulted in a frictional binding of the parts connecting the diaphragm or pressure responsive member with the plug. In valves for controlling fluids at high pressure and high rate of flow a turbine effect may also occur at the valve disc plug which greatly reduces the life of the plug and seat rings.

It is accordingly the principal object of the present invention to provide a control valve of the diaphragm type which will be substantially free from friction.

It is a further object of the present invention to provide a control valve in which the desired linearity may be obtained and which will have a very low hysteresis.

It is a further object of the present invention to provide a control valve in which the tendency of the disc plug to rotate will be obviated.

Other objects of the invention will be apparent from the annexed specification and claims.

The nature and characteristic features of the invention will be more readily understood from the following description, taken in connection with the accompanying drawing forming part hereof, in which:

Figure 1 is a diagrammatic view illustrating a control valve in accordance with the present invention and of a type which is particularly adapted for operation by air as the control pressure fluid and for use in controlling fluids at very high pressures;

Fig. 2 is an enlarged central sectional view of the superstructure of a control valve in accordance with the present invention, parts being shown in elevation;

Fig. 3 is a fragmentary central sectional view, still further enlarged, illustrating certain of the details of construction; and Fig. 4 is a fragmentary sectional view taken approximately on the line 4—4 of Fig. 3.

It will, of course, be understood that the description and drawing herein are illustrative merely, and that various modifications and changes may be made in the structure disclosed without departing from the spirit of the invention.

Referring more particularly to the drawing, the control valve includes a valve body 10 which may be of any desired type with single or multiple seat rings 11 and with any desired type of plug operated by a lower valve stem 13. The control valve proper preferably includes a superstructure 14 enclosed or open as desired with a flange 15 for securing the flange 16 of a top closure plate 17 thereto with a diaphragm 18 clamped or secured between the flange 15 and the flange 16. The diaphragm 18 is provided with a diaphragm plate 19 and a pressure chamber 20 is provided between the diaphragm 18 and the closure plate 17 to which pressure fluid for actuation is delivered by a pipe 21 threaded or otherwise connected to the closure plate 17.

The diaphragm plate 19 preferably has a spring 22 bearing against the lower side thereof, the other end of the spring 22 being carried on a spring flange 23 adjustably mounted in the superstructure 14 in any desired manner for varying the force exerted by the spring 22.

The diaphragm plate 19 is preferably provided at the central portion thereof with a downwardly extending hollow cylindrical portion 25 and has a locking piece 26 mounted therein. The locking piece 26 has an internal space 27 which is non-circular and preferably hexagonal for purposes to be explained and also has a cut out portion 28 at the lower part thereof for clearance. A bearing lock member 29 is threaded within the downwardly extending cylindrical portion 25 and has a rim 30 at the upper face thereof for engagement with a bearing and a cutaway portion 31 for clearance.

The bearing 32 is preferably a self aligning ball bearing and includes an outer race 33, an inner annulus 34, and a plurality of rows of balls 35 together with a suitable ball retainer 36 of any desired type. The outer race 33 is adapted to be clamped between the locking piece 26 and the bearing lock member 29 by adjustment of the bearing lock member 29 to gripping position. A set screw 37 is provided for holding the bearing lock member 29 in fixed locking position. The annulus 34 is mounted on a reduced end portion of an upper valve stem 40 and bears against a shoulder 41 thereon. A locking member 42 is provided on the threaded end of the upper stem 40 for clamping the annulus 34 of the bearing in locked position against the shoulder 41. A pin 43 is preferably passed through the bearing lock member 42 and the stem 40 for holding the bearing lock member 42 in fixed locking position.

The bearing lock member 42 has external faces 44 which are also noncircular and preferably hexagonal, the faces 44 being spaced inwardly from the interior faces 27 of the lock piece 26 a small distance to permit of slight rocking movement between these members but to prevent rotation of the upper stem 40 and the parts secured thereto. The lower end of the upper stem 40 may be provided with an indicator pointer 45 and is coupled to the lower stem 13 of the valve in any desired manner, such for example as by means of the coupling 46.

In the operation of the control valve an increase in pressure through the pipe 21 is effective in the chamber 20 and against the upper side of the diaphragm 18 and tends to overcome at least in part the pressure exerted by the spring 22.

In practice there has been a tendency of the diaphragm to tilt and get out of alignment, thereby producing the friction effects hereinbefore referred to. Should the diaphragm 18 and its plate 19 tend to tilt, the misalignment is accommodated by the bearing member 32 and the upper stem 40 is actuated free from friction which would otherwise be set up. The controlling of the plug 12 to the desired position in accordance with the pressure applied in the chamber 20 is thus effected free from the friction heretofore encountered and with the hysteresis substantially eliminated.

I claim:

1. In a control valve having a stem operated member for controlling fluid flow and expansible chamber means including a plate member responsive to changes in fluid pressure, the means for connecting said plate member and the upper end of said stem including a hollow portion on said plate, an outer annulus secured in said hollow portion, said outer annulus having a concave inner surface, an inner annulus on the upper end of said stem and within said outer annulus, said inner annulus having a convex outer surface, a plurality of balls disposed between the surfaces of said annuluses, and interengaging portions carried by said plate member and the upper end of said stem to permit angular movement of said annuluses with respect to each other but preventing rotation of said stem with respect to said plate member.

2. In a control valve having a stem operated member for controlling fluid flow and expansible chamber means including a plate member responsive to changes in fluid pressure, the means for connecting said plate member and the upper end of said stem including members interposed between said plate and said upper end of said stem permitting angular movement of said plate with respect to said stem, said plate having an interior non-circular portion and the terminal end of the stem having a non-circular exterior portion complemental to but spaced from said other non-circular portion to permit angular movement of said plate with respect to said stem but preventing rotation of said stem with respect to said plate member.

3. In a control valve having a stem operated member for controlling fluid flow and expansible chamber means including a plate member responsive to changes in fluid pressure, the means for connecting said plate member and the upper terminal end of said stem including a hollow portion on said plate with a non-circular interior, an outer annulus secured in said hollow portion, said outer annulus having a concave inner surface, an inner annulus mounted on the upper end of said stem within said outer annulus, said inner annulus having a convex outer surface, a plurality of balls disposed between the surfaces of said annuluses, and a terminal member on the end of said stem, said terminal member having a non-circular exterior complemental to but spaced from said non-circular interior to permit angular movement of said plate with respect to said stem but preventing rotation of said stem with respect to said plate member.

4. In a control valve having a stem operated member for controlling fluid flow and expansible chamber means including a plate member responsive to changes in fluid pressure, the means for connecting said plate member and the upper terminal end of said stem including a hollow portion on said plate, a spacer in the hollow portion having a non-circular interior, an outer annulus secured in said hollow portion in abutting relationship to said spacer, said outer annulus having a concave inner surface, a holding member carried by said hollow portion in engagement with said outer annulus, an inner annulus on the upper end of said stem within said outer annulus, said inner annulus having a convex outer surface, a plurality of balls disposed between the surfaces of said annuluses, and a locking member on the end of said stem for holding the inner annulus in position, said locking member having a non-circular exterior complemental to but spaced from said non-circular interior to permit angular movement of said plate with respect to said stem but preventing rotation of said stem with respect to said plate member.

5. In a control valve having a stem operated member for controlling fluid flow and expansible chamber means including a plate member responsive to changes in fluid pressure, the means for connecting said plate member and the upper end of said stem including a hollow portion on said plate having a non-circular interior, an outer annulus secured in said hollow portion, said outer annulus having a concave inner surface, an inner annulus mounted on the uper end of said stem within said outer annulus, said inner annulus having a convex outer surface, a plurality of balls disposed between the surfaces of said annuluses, the upper end of said stem having a non-circular exterior complemental to but spaced from said non-circular interior to permit angular movement of said annuluses with respect to each other but preventing rotation of said annuluses with respect to each other.

FRANCIS RUDOLPH GOEHRING.

REFERENCES CITED

The following references are of record in the file of this patent:

UNITED STATES PATENTS

| Number | Name | Date |
| --- | --- | --- |
| 1,273,304 | Yates | July 23, 1918 |
| 1,959,259 | Zerk | May 15, 1934 |
| 2,001,318 | Spence | May 14, 1935 |
| 2,110,859 | Goehring | Mar. 15, 1938 |
| 2,264,677 | Oxland | Dec. 2, 1941 |

FOREIGN PATENTS

| Number | Country | Date |
| --- | --- | --- |
| 749,705 | France | 1933 |